United States Patent Office 3,706,589
Patented Dec. 19, 1972

3,706,589
METHOD FOR TEMPORARILY PROTECTING THE SURFACES OF AN ARTICLE
Tadanori Fukuda and Masao Takahashi, Otsu-shi, Shoji Ogihara, Tokorozawa-shi, and Masato Sekiya, Tokyo, Japan, assignors to Toray Industries, Inc., Honda Motor Company, Ltd., and Fujijura Kasei Company, Ltd., all of Tokyo, Japan, fractional part interest to each
No Drawing. Filed June 15, 1970, Ser. No. 46,541
Claims priority, application Japan, June 19, 1969, 44/48,050, 44/48,051
Int. Cl. B44d 1/14
U.S. Cl. 117—6    4 Claims

ABSTRACT OF THE DISCLOSURE

Surface protective compositions consisting essentially of a mixture of inorganic and/or organic powder and a dispersant-binder of wax and/or synthetic resin emulsion with water serving as the main solvent, and a method for temporary surface protection of articles wherein the above composition is applied onto the surface to be protected, and further water-insoluble plastic coating is formed thereon.

---

This invention relates to surface-protective coating compositions and method of protecting the surface of an article.

More particularly, the invention relates to coating compositions for protecting articles' surfaces, i.e. body, bonnet, bumper, fender, door, trunk, of automobiles, either as parts or as assembled whole, from damage or soil, and method for protecting surfaces of such articles.

During assembling, transportation or storage of automobiles, bonnets, painted body surfaces, and bumpers are occasionally scratched and soiled. Therefore, surface protection of such articles presents a very serious problem to car makers. There is also a problem of rusting of car braids during marine transportation.

Conventionally, surface protection of automobiles has been provided by application of wax. However, the effect of such a method is insufficient for preventing damages and rust. Furthermore, removal of the wax is difficult, and in summer the wax applied for surface protection itself causes discoloring or chalking of the painted car surfaces. The wax must be removed by such cumbersome means as use of steam-generating washer, cleaner, etc., simple wiping with cloth failing to achieve the purpose. In view of those inconveniences, development of suitable protection means has been urgently sought for.

When the parts are damaged during assembling of automobiles, the damages are repaired. If the coated or painted surface is scratched, normally the scratched area is polished with sandpaper and touched up by reapplication of suitable paint. As the paint for touching up, lacquer is most widely used because it requires no baking and therefore is convenient for rationalization of assembly line. However, some lacquer paints exhibit very poor under coat adhesion with the base coating at the shadeoff portions, occasionally the peeling-off strength between the base coating and touch-up coating being as low as 20 g./cm. or even less.

We have engaged in extensive researches seeking for remedies of those inconveniences, and now discovered coating composition which can be used on painted surfaces of poor under coat adhesion, never peeling off due to wind pressure, etc., and which are easily removable with simple means and effective for protection against damages and soil. We also hereby completed a method for providing effective protection of surfaces, inclusive of painted surfaces, against damages and soil, by forming easily removable coatings on the surfaces.

This invention thus relates to coating compositions for surface protection essentially consisting of a mixture of 50–99.9 wt. percent of at least one powder selected from the group consisting of finely divided inorganic and organic compounds having no reactivity with water and the solubility in 100 g. of 20° C. water of no greater than 1, and 0.1–50 wt. percent of at least one dispersant-binder selected from the group consisting of waxes and synthetic resin emulsions with water serving as the chief solvent. The invention again concerns with a method for protecting surfaces of articles, which comprises applying to the surfaces a composition consisting essentially of a mixture of 50–99.9 wt. percent of at least one powder selected from the group consisting of finely divided inorganic and organic compounds which have no reactivity with water and the solubility in 100 g. of 20° C. water of no greater than 1, and 0.1–50 wt. percent of at least one dispersant-binder selected from the group consisting of waxes and synthetic resin emulsions with water serving as the chief solvent, and forming on said coated surfaces water-insoluble plastic coating.

As the finely divided compound useful for the invention, powder of at least one inorganic or organic substance satisfying the following conditions is used. That is, the substance must have a solubility in water at 20° C. (gram number soluble in 100 g. of water) of not greater than 1, and have no reactivity with water.

Inorganic powders provided mainly by water-insoluble inorganic oxides and salts, e.g., barium sulfate, calcium carbonate, barium carbonate, magnesium carbonate, calcium sulfate may be used, but there may be advantageously used powders provided by titanium oxide, iron oxide, zinc flower, cuprous oxide, zinc oxide, clay, trilead tetroxide, white lead, lithopone ($BaSO_4+ZnS$), ultramarine, talc, chromium oxide, red lead, red iron oxide, loess, lead sulfate, silica gel, silicic acid oxide, and polishing powder.

Useful organic powders are provided mainly by synthetic polymers, which may be thermoplastic resins, thermosetting resins, or rubber, such as, for example, polyethylene, polypropylene, polyvinyl chloride, polystyrene, polyamide, polyester, acrylic, phenolic, urea, and melamine resins.

Powders of which solubility in water is greater than 1 are objectionable in that, if they are employed in the surface-protective compositions in accordance with the invention the compositions easily come off from the applied surfaces due to rain, for example, when the automobiles are left uncovered in the open air, thus entirely failing to achieve the intended protection from soil and damage. Also compounds of high solubility in water cause delustering and discoloring of painted surfaces.

In view of the stability of the dispersion and ease of the spraying operation, it is preferable that the grain size of the powder is in the range of from 0.01 to 200 microns. In case the grain size is above 200 microns, the spraying operability is low and the coating composition tends to be washed away from the applied surface with rain. Accordingly, it is not desired that the grain size of the powder exceeds 200 microns.

The term "wax" is used in this specification in broad sense, inclusive of natural and petroleum waxes. Natural waxes can be classified by their physical properties, into liquid and solid waxes, the former including, for example, sperm oil, arctic sperm oil, etc., and the latter including carnauba wax, cotton wax, etc. Petroleum waxes can be classified into paraffin wax, microcrystalline wax, and petrolatum, according to the method of their preparation and physical properties. Most of petroleum waxes have melting points ranging from approximately 40–110° C.

Molten mixtures of polyethylene with wax become filmy. Such filmy wax is also included within the scope of this invention.

The waxes useful for the invention preferably have melting points not lower than 50° C., microcrystalline waxes having melting points ranging from 70°–100° C. being particularly preferred. Some of the waxes having melting points below 50° C. may decolorize or whiten printed surfaces.

When the composition of this invention consists of above-described powder and wax, they are used at the quantitative ratios of, respectively, 50–99.9 wt. percent and 50–0.1 wt. percent. When the powder content is less than 50 wt. percent and the wax content exceeds 50 wt. percent protection of surfaces from scratches incurred by iron powder, etc. becomes insufficient, and removal of the composition becomes difficult.

Whereas, if the powder content exceeds 99.9 wt. percent and wax content is reduced below 0.1 wax percent, the coating composition tends to be washed away from the applied surfaces with rain, or scattered by wind, failing to achieve the intended surface protection.

The composition in accordance with the invention is dispersed or dissolved in suitable solvent which dissolves the above-described wax, and is applied onto the article surfaces by themselves known means such as brush coating spray coating. Then the solvent is evaporated by natural or forced drying. Therefore, preferred solvents are water and aliphatic hydrocarbons which do not dissolve or swell the painted surfaces of automobiles. As the aliphatic hydrocarbons, pentane, octane, mineral spirit, etc. can be suitably used. For the convenient spraying operation, aliphatic hydrocarbons having melting point ranging from 100–200° C. are particularly preferred. It is also permissible to add another solvent which is compatible with the aliphatic hydrocarbon, such as aromatic hydrocarbons, e.g., toluene, xylene, benzene, and the like, or alcohols, e.g., ethanol, methanol, isopropanol, and the like.

The synthetic resin emulsions useful for the invention include, for example, emulsions of polyvinyl chloride, vinyl chloride-vinyl acetate copolymer, polyvinyl acetate, polyacrylates, acrylate copolymers, acrylonitrile-acrylate copolymers, vinylidene chloride-vinyl chloride copolymers, polystyrene, styrene-butadiene copolymers, methyl acrylate-butadiene copolymers, etc. Those polymers are preferably used in the form of emulsion with water serving as the chief solvent. Those synthetic resin emulsions can be formed either by emulsion polymerization or dispersion of solution. The minimum film-forming temperature (MFT) of those emulsions for forming synthetic resin film or coating preferably ranges from −60 to 100° C., particularly 0°–100° C. Organic solvent solution of the synthetic resins exhibit too strong binding action, making removal of the coating from the applied surfaces difficult. Also when the minimum film-forming temperature exceeds 100° C., the heating at above 100° C. necessitated for attaining the binder's effect may cause delustering and discoloring of the painted surfaces to which the composition is applied.

The aforesaid powder and synthetic resin emulsion are used at the quantitative ratios within the ranges of, respectively, 50–99.9 wt. percent and 50–0.1 wt. percent (as solid). If the powder content of the composition is less than 50 wt. percent and the synthetic resin emulsion (as solid) content exceeds 50 wt. percent, the composition's damage-preventing effect against iron powder, etc. is impaired, and its removal from the applied surfaces becomes difficult. Again, if the powder content exceeds 99.9 wt. percent and synthetic resin emulsion (as solid) is less than 0.1 wt. percent, the coating formed of the composition is easily washed away with rain, or scattered by wind, failing to achieve the surface protection intended in the invention.

In case the wax and synthetic resin emulsion are concurrently employed, the composition may consists of 50–99.9 wt. percent of the powder and 50–0.1 wt. percent of the synthetic resin emulsion plus wax synthetic resin emulsion (as solid): wax=50:50–99.9:0.1. The ratio between the synthetic resin emulsion and wax is influenced by the powder content. For example, when the powder content is within the range of 50–75 wt. percent, the ratio of emulsion to wax ranges from 50:50 to approximately 70:30. Also with the powder content ranging from 75–99.9 wt. percent, the ratio ranges from approximately 70:30–99.7:0.3. Within the specified ranges, the compositions of the invention exhibit easy removability, but will not be washed away by rain, sufficiently performing the protection against damages and soil incurred by iron powder, etc.

In case the composition of this invention is applied to protection of surfaces of automobiles, in view of the peeling strength of the protective coating and its resistance against washing-away with rain, it is preferable that the mixing ratio of the powder to wax or synthetic resin emulsion or a mixture thereof is in the range of from 99.0:1.0 to 99.9:0.1 based on the weight. In case the powder content is less than 99.0 wt. percent, the peeling strength of the protective coating is inferior. In case the powder content is more than 99 wt. percent, the protective coating tends to be washed away from the applied surface with rain or to be scattered by wind failing to achieve the intended surface protection.

The compositions of this invention may contain other known additives so as to be colored, or imparted with improved flowabiilty, smoothness and stability. Such additives may be blended into the subject composition, in an amount not exceeding 30 wt. percent to the total composition weight. Particularly favorable result can be obtained with such additives as monooctyl phthalate, dibutyl phthalate, silicone and the like. Also ultraviolet ray absorbing agent or antioxidant may be added to the composition to improve the latter's weatherability. The protective coating thus formed from the subject composition on articles, surfaces will not be easily peeled off by the action of rain or wind. On the other hand, the coating can be easily wiped off with cloth, or washed away with water. During the removal, furthermore, the paint on the repaired area of poor under coat adhesion with the protective coating will not peel off. The coating thus effectively protects the articles' surfaces from soil and damage.

The method of articles' surface protection in accordance with the invention comprises applying onto the surfaces to be protected the composition consisting essentially of a mixture of 50–99.9 wt. percent of at least one powder selected from finely divided inorganic and organic compounds which are non-reactive with water and have solubilities in 100 g. of 20° C. water of not greater than 1, and 0.1–50 wt. percent of at least one dispersant-binder selected from waxes and synthetic emulsions with water serving as the main solvent, and thereafter further forming on the coated surfaces water-insoluble plastic coating.

According to the subject method, the composition as has been described is used for the undercoating. It is perfectly permissible to add to the undercoating composition other additives for coloring, or improving such properties as flowability, smoothness, and stability, of the latter.

On the coating of said composition, further coating of various water-insoluble plastics is formed. Such water-insoluble plastic film is provided by, for example, cellophane, polyethylene, polyvinyl chloride, polyvinylidene chloride, polypropylene, polyester, polycarbonate, nylon, polystyrene, styrene-butadiene copolymer, polyvinyl alcohol, ethylene-vinyl acetate copolymer, polyacrylate, vinyl chloride-acrylate copolymer, vinyl chloride-vinyl acetate copolymer, polyvinyl butyral, acrylonitrile-acrylate copolymer, rubber hydrochloride, synthetic rubber, fluorine-containing polymer, and the like.

Those water-insoluble plastic films may suitably contain other known additives, e.g., plasticizer, lubricant such as silicone, ultraviolet ray absorbing agent, and antioxidant.

Method of forming the upper coating differs depending on the type of plastics employed, and is not critical. For example, films of such plastics as polyethylene, polypropylene, polyvinyl chloride, etc. may simply be mechanically or manually applied, adhered, or coated by shrinkage of the film due to heating of the surfaces to be protected. For polyesters and vinylon, coating method is employed. Also with ethylene-vinyl acetate copolymer, vinyl chloride-acrylate copolymer, acrylonitrile-acrylate copolymer, etc. which are solvent-soluble, such means as brush coating and spray coating are employed.

When the surface to be protected is painted, such solvents which do not swell the paint, as aliphatic hydrocarbon, lower saturated aliphatic alcohol, and water, are preferred. More specifically, ligroine, heptane, octane, mineral spirit, aliphatic naphtha, methanol, ethanol, and propanol are conveniently used. Whereas, the plastics which are difficultly soluble in those solvents may be formed into organosol by dispersing them by the action of surface active agent.

According to the subject method, excellent surface protection from damage and soil unachievable by conventional methods is provided. Furthermore, the coating can be easily removed in sheet form before actual use. Particularly when the above composition contains synthetic resin emulsion, the removal of undercoating is more facilitated, and the intimate contact between the under and upper coatings is still improved. Consequently, the upper film will not be peeled off by rain or wind, while the undercoating can be easily washed away with water, etc.

The foregoing explanations have been given mainly as to surface protection of automobiles, but the invention is likewise applicable to electric goods, construction materials, etc. Hereinafter the invention will be explained with reference to the working examples.

EXAMPLE 1

Microcrystalline wax (melting point: 85° C.), and a paraffin wax (melting point: 58–60° C.) were dissolved in Esso Naphtha No. 3 (an aliphatic hydrocarbon melting at 83.0–125.5° C., product of Esso Standard Petroleum Co.) under heating at 80° C. To the solution then rutile-type titanium oxide, silica gel and silicone ("Toshiba Silicone YF-37," product of Tokyo Shibaura Electric Co.) were added. The mixture was milled for 6 hours in a ball mill. The titanium oxide was completely insoluble in water. The mixing ratios of the above components are given in Table 1 below.

TABLE 1

| Component: | Part by weight |
| --- | --- |
| Esso Naphtha No. 3 | 100 |
| Microcrystalline wax (M.P. 85° C.) | 10 |
| Paraffin wax (M.P. 58–60° C.) | 4 |
| Rutile-type titanium oxide | 81 |
| Silica gel | 4 |
| Toshiba Silicone YF-37 | 1 |

The above composition was spray coated onto the body of "Honda N-360" (white, the automobile manufactured by Honda Giken Kogyo Co.) to a thickness after drying of approximately 100μ. Then the solvent was evaporated by natural drying. After approximately 5 minutes' standing, the body surfaces were coated with substantially dry white film. The car was left in the open air for one month, during which the coating firmly stayed on the surfaces, not washed away with rain or scattered by wind. The coating, however, could be easily wiped off with dry cloth. At the time of removal, the originally applied white paint of low under coat adhesion on the repaired area did not come off with the coating. After polishing, the body surfaces of the car were examined with naked eye. No appreciable change on the car's painted surfaces such as discoloring or luster reduction was recognizable. Neither rusting nor damage with iron powder or fine concrete particles occurred. Thus the soil- and damage-preventing effect of the subject composition was clearly demonstrated.

EXAMPLE 2

Microcrystalline wax melting at 90° C. and a paraffin wax melting at 68–70° C. were dissolved in Esso Naphtha No. 3 and ethanol. To the solution then barium sulfate, silica gel, "Toshiba Silicone YF-37" and ultraviolet ray absorbing agent, 2[2'-hydroxy-5'-methylphenyl) benzotriazole], were added, followed by 6 hours' milling in a ball mill. Barium sulfate has a solubility in 20° C. water of $2.5 \times 10^{-4}$, and is completely non-reactive with water. The quantitative ratios of the components in the composition were as in Table 2 below.

TABLE 2

| Component: | Part by weight |
| --- | --- |
| Esso Naphtha No. 3 | 80 |
| Ethanol | 20 |
| Barium sulfate | 78 |
| Microcrystalline wax (M.P. 90° C.) | 9 |
| Paraffin wax (M.P. 68–70° C.) | 5 |
| Silica gel | 4 |
| Toshiba Silicone "YF-37" | 3.8 |
| 2(2'-hydroxy-5'-methylphenyl)benzotriazole | 0.2 |

The above composition was spray coated onto the body of "Honda N-360" (red) to a dry film thickness of 100–150μ.

After natural drying, the car was left outdoors uncovered for a month, but substantially no detrimental effect on the painted body surfaces, such as discoloration and chalking, was recognizable.

The coating was neither washed away by rain nor scattered by wind, but could be easily wiped off with cloth as in Example 1. Thus the composition provided perfect protection of automobile surfaces from soiling with muddy water, iron powder and fine concrete powder, as well as from scratching and like damages.

EXAMPLE 3

A mixture of carnauba wax melting at 78–84° C., paraffin wax melting at 58–60° C., Esso Naphtha No. 3, Span 60 (SP-60), and Tween 60 (ST-21) was blended under heating at 55° C., and to which water was gradually added at 60° C. under stirring to form a wax emulsion A (cf. Table 3).

Light calcium carbonate powder (solubility: 0.0014/25° C.) and water were added to the emulsion A, followed by milling in a ball mill to form a dispersion B (cf. Table 4).

This dispersion was spray coated onto the body of "Nissan Sunny" (red, the automobile manufactured by Nissan Automobiles Co.). Upon air-drying, the car was coated with white film. Thus coated car was transported on train, but the coating was not scattered off under the high wind pressure. Again it was not appreciably washed away with rain, but could be easily removed with brush and water. Similarly to Example 1, the coating exhibited no detrimental effect on painted surfaces or metal surfaces of the car, but effectively protected the whole body from soil and damage.

TABLE 3

Emulsion A

| Component: | Part by weight |
|---|---|
| Carnauba wax (M.P. 78–84° C.) | 15 |
| Paraffin wax (M.P. 58–60° C.) | 15 |
| Esso Naphtha No. 3 | 10 |
| Span 60 (SP–60) [1] | 3.0 |
| Tween 60 (ST–21) [2] | 3.0 |
| Water | 54 |

[1] An ester of sorbitol condensate and stearic acid, product of Nippon Yushi Co., Ltd.
[2] An ether of Span type of (1) above with polyethylene oxide chain, product of Nippon Yushi Co., Ltd.

TABLE 4

Dispersion B

| Component: | Part by weight |
|---|---|
| Emulsion A | 12 |
| Light calcium carbonate | 96 |
| Water | 100 |

EXAMPLE 4

A mixture of 7 parts of microcrystalline wax melting at 100° C., 0.7 part of Tween 60 (ST–21) employed in Example 3, 1.0 part of Span 60 (SP–60), 2.5 parts of zinc stearate, and 7 parts of Esso Naphtha No. 5, was heated to 90° C. Separately, a mixture of 3.0 parts of 70% sorbitol and 50 parts of water was heated to 95° C., and added to the first mixture under stirring. The system was cooled to 55° C., and formed into a creamy dispersion by the addition of 10 parts of 4% methyl cellulose. To the dispersion 80 parts of clay, 10 parts of talc, and 3 parts of silica gel were added, followed by dilution with water to make the non-volatile component therein 50%. Upon thorough mixing and grinding of the diluted dispersion in a ball mill, a stable dispersion was obtained. This dispersion was spray coated onto a test piece which had been baked with a melamine alkyd resin paint "Amilac" (product of Kansai Paint Co.) at 130° C. for 30 minutes. Then the solvent was evaporated from the coating film by forced drying at 80° C. After Weather-O-Meter test of 200 hours, the "Amilac" painted test piece from which the coating was washed away with water retained excellent luster, and showed no discoloration or whitening. Again the test piece was left outdoors for one month uncovered, to be examined of the soil and damage-preventing effect of the coating. Very satisfactory results were obtained.

EXAMPLE 5

A mixture composed of 70 parts of 246µ–147µ (method of Tyler, U.S.A.) polyethylene powder, 5 parts of silica gel, 3 parts of Airrol OT (product of Toho Kagaku Co.), 22 parts of microcrystalline wax melting at 100.5° C., 80 parts of Isoper E (M.P. 116–143° C., product of Esso Standard Petroleum Co.) and 20 parts of ethanol, was milled in a ball mill to be formed into a dispersion. The dispersion was sprayed onto a lacquer-coated surface ("Lock Lacquer," product of Lock Paint Co.). After natural drying, the spray-coated test piece was left outdoors uncovered for half a year. The coating exhibited excellent weatherability, showing no recognizable deterioration in appearance. The coating could be easily wiped off with cloth, without in any way impairing the lacquer coating. Thus the coating's excellent soil- and damage-preventing effect against iron powder, etc. was evident.

EXAMPLE 6

Seventy (70) parts of polyethylene powder and 30 parts of paraffin wax melting at 60° C. were melted, and extruded into a film sheet to form a wax film. Upon mixing 7 parts of this wax film with 93 parts of finely divided nylon-6 (product of Toray Industries, Inc.), 60 parts of Isoper E, 40 parts of ethanol, and 2 parts of Airrol OP thoroughly, a stable dispersion was obtained. The dispersion was sprayed onto the car body of "Honda N–360" employed in Example 1, to be examined of its protective action and removability. Satisfactory results in both respects were obtained.

CONTROLS 1–6

Example 1 was repeated except that the titanium oxide was replaced by sodium hydroxide powder which has high solubility in water, and also by calcium carbide powder which reacts with water, in each run, and removability, influence on original painting, and protective action, of the coatings formed of the compositions were examined. Similarly, Example 1 was repeated except that the blend ratio of titanium oxide and wax was varied in each run, to examine the correlation between the blend ratio and properties of the coating. Further for comparison, the car was similarly exposed to open air, without the protective coating. The results are shown in Table 5.

As clearly demonstrated by the obtained data, use of water-soluble sodium hydroxide powder or calcium carbide reactive with water causes deterioration of luster and whitening of the painted surfaces of car body. Again, when sodium hydroxide was used, the coating was washed away with rain, entirely failing to provide effective protection from damage and soil. When titanium oxide powder content in the composition was reduced to below 50 wt. percent, the protective action became insufficient, particularly that against damage by iron powder etc. being impaired. Whereas, when no protective coating was given, the painted surfaces of the car were damaged, and discolored by rust.

TABLE 5

| Run No. | Powder Type | Powder Content (wt. part) | Wax Type | Wax Content (wt. part) | Solubility of powder (20° C.) | Removability of coating | Influence on painted car surface | Protective effect |
|---|---|---|---|---|---|---|---|---|
| Control 1 | Sodium hydroxide | 81 | Microcrystalline wax (M.P. 85° C.) | (10:4)14 | 42 or above | Good | Delustering, discoloration. | Coating was washed away with rain, providing no protection against soil and damage. |
| Control 2 | Calcium carbide | 81 | Paraffin wax (M.P. 58–60° C.) | | Decomposition Ca(CH)$_2$+C$_2$H$_2$ | do | None | Protection against damages by iron powder was obtained. |
| Control 3 | Rutile-type titanium oxide. | 20 | Same as above | 80 | Insoluble | Poor | None | Soil resistance was imparted, but not the protection against damages by iron powder. |
| Control 4 | do | 40 | do | 60 | do | do | do | Insufficient protection against damages with iron powder. |
| Example 1 | do | 81 | do | 41 | do | Good | do | Excellent protection against soil and damage. |
| Control 5 | do | 99.5 | do | 0.5 | do | do | do | Coating was washed away or scattered by rain and wind, providing no intended protection. |
| Control 6 | No protective coating | | | | | | | Painted surfaces of the car were damaged with iron powder, and discolored. |

EXAMPLE 7

Microcrystalline wax melting at 85° C. was dissolved in Esso Naphtha No. 3 under heating at 80° C. Then finely divided talc and silica gel powder were added to the subsequently cooled solution. The mixture was milled in a ball mill for 6 hours, to form a white dispersion. The blend ratio of named components was as in Table 6.

TABLE 6

| Component: | Part by weight |
|---|---|
| Esso Naphtha No. 3 | 100 |
| Microcrystalline wax (M.P. 85° C.) | 0.4 |
| Talc | 99.2 |
| Silica gel | 0.4 |

The entire surfaces of a commercial automobile were spray coated with the dispersion to a dry film thickness of approximately 100μ. Then the solvent was evaporated by natural drying.

Substantially dry state was reached after approximately 5 minutes, and the car surfaces were coated with white film. The car was then left outdoors, uncovered for a month in summer, but the coating was not washed away with rain or scattered about by wind. On the other hand, the coating could be automatically washed off with water, with the car-washer conventionally employed. After removal of the coating, the car surfaces perfectly retained the original appearance. Thus the composition had no detrimental effect on the coating thereunder, but provided excellent protection against soil and damage.

As a control, the same car without the protective coating was similarly left outdoors, uncovered for a month in summer. Iron powder coming from the nearby factories stuck in the painted surfaces of the car, and the surfaces were slightly discolored due to rust. Scratches were formed on the surfaces in the attempt to wipe off the iron powder.

EXAMPLE 8

A mixture composed of carnauba wax melting at 78–84° C., a paraffin wax melting at 58–60° C., Esso Naphtha No. 3, Span 60 (SP–60), and Tween 60 (ST–221) was heated at 55° C., and in the meantime water was gradually added thereto to form an aqueous dispersion of wax (cf. Table 7).

with muddy water, iron powder, finely divided concrete, etc. as well as from thereby incurred damage.

TABLE 7

Blend ratio of dispersion

| Component: | Part by weight |
|---|---|
| Carnauba wax (M.P. 78–84° C.) | 2 |
| Paraffin wax (M.P. 58–60° C.) | 5 |
| Esso Naphtha No. 3 | 5 |
| Span 60 (SP–60) [1] | 6 |
| Tween 60 (ST–221) [2] | 4 |
| Water | 78 |

[1] Ester of sorbitol condensate with stearic acid, product of Nippon Yushi Co.
[2] Ether of Span-type of above (1) with polyethylene oxide chain, product of Nippon Yushi Co.

EXAMPLE 9

A mixture composed of 0.7 part of microcrystalline wax melting at 100° C., 0.1 part of Tween 60 (ST–221), 0.3 part of Span 60 (SP–60), 0.3 part of zinc stearate, and 7 parts of Esso Naphtha No. 5, was heated to 90° C.

Separately, a mixture composed of 3.0 parts of 70% sorbitol and 50 parts of water was heated to 95° C., and added to the first mixture under stirring. The system was then cooled to 55° C., and formed into a creamy dispersion by addition of 10 parts of 4% methyl cellulose, followed by further addition of 100 parts of titanium oxide and 5 parts of silica gel. The system was diluted with water so that the non-volatile component in the composition should become 50%, and thoroughly dispersed and milled in a ball mill to provide a white dispersion of high stability. Automobile surfaces can be effectively protected similarly to Example 7, by applying this dispersion thereonto. The coating could be removed by washing with water, using a conventional car-washer.

EXAMPLE 10 AND CONTROLS 7–11

Example 7 was repeated except that the talc powder was replaced in each run by silica, calcium carbonate, magnesium carbonate, and barium sulfate. Also in other runs the amount of talc used was varied, with the results as given in Table 8 below. Silica was usable for the subject composition, but magnesium carbonate and calcium carbonate proved inadequate.

TABLE 8

| Run No. | Type of powder | Amount of powder (wt. part) | Removability of coating [1] | Influence on coated surface | Protective effect |
|---|---|---|---|---|---|
| Control 7 | Talc | 80 | Poor | No appreciable influence | Effective for protection against soil. |
| Example 7 | do | 99.2 | Good | do | Do. |
| Control 8 | do | 100 | do | do | Coating was washed away and scattered about by rain and wind, providing no effective protection. |
| Example 10 | Silica | 99.2 | do | do | Effective for protection against soil. |
| Control 9 | Calcium carbonate. | 99.2 | do | Luster of painted touch-up portion was reduced. Aluminum die cast parts were discolored. | Coating was partially washed off with rain, and the protective action was insufficient. |
| Control 10 | Magnesium carbonate. | 99.2 | do | do | Do. |
| Control 11 | Barium sulfate. | 99.2 | do | do | Do. |

[1] "Removability" refers to that when the car was washed with water, using "Car-Beautician" car washer. When the surface was rubbed with a brush of approximately 3.3 cm. long, with a pressure of 10 g, while pouring tap water of 500 g. in hydraulic pressure at a distance of 30 cm. from the test piece for 30 minutes, if the coating could be completely removed by 10 or less reciprocative motions of the brush, the removability was graded good. The brush was moved to a rate of one reciprocation per second, over a distance of 5 cm.

Then to 100 parts of the dispersion, 200 parts of polishing powder, 792 parts of clay, 1 part of Toshiba Silicone YF–37, and 1,000 parts of water were added, followed by milling in a ball mill to form a white dispersion.

The dispersion was coated onto a commercial automobile to a dry film thickness of 100–150μ. After natural drying the coating, the car was left outdoors for a month from July to August. No detrimental effect on the car surfaces was recognized, nor the painted surfaces thereof discolored or whitened. The coating was not washed away or scattered about by rain or wind, although it could be easily washed off with conventional car-washer. The coating effectively protected the surfaces from soiling When talc was used as the powder, substantially no detrimental effect on the coated surface was recognized, and the coating provided excellent protective action.

In the automatic water-washing with the car washer, "Car-Beautician," the coating containing less than 99.0% of talc could not be sufficiently washed off, but when it was 99.0% or above (Example 7), complete removal became possible.

When talc only was used without any wax, the powder was washed off or scattered about by rain or wind, providing none of the intended protective action.

Whereas, when talc was replaced by calcium carbonate, magnesium carbonate, or barium sulfate, painted touch-up portion was slightly discolored, and had reduced luster, during the exposure in hot and humid atmosphere of summer. Also the aluminium die cast parts not plated, such as door knob and mounting base of back mirror, were discolored. Those powders were more apt to be washed off with rain and exhibited only insufficient protective action.

EXAMPLE 11

To 20 wt. parts of ethylene-vinyl acetate copolymer emulsion having a minimum film-forming temperature (MFT) of 0° C., EVAC EV–15 (product of Dainippon Ink and Chemical Industries, Inc., solid component: 55%), 250 wt. parts of water and 90 wt. parts of rutile-type titanium oxide powder were added, and mixed with a stirrer for an hour. The titanium oxide has no solubility in water. This composition was spray coated on the body surfaces of "Honda N-360" (red) at a ratio of approximately 70 g./m.$^2$, on dry basis, and dried at 50° C.

Substantially dry state was obtained by approximately 10 minutes' drying, and the car surfaces were covered with white coating. The same car was left outdoors, uncovered for two months, but the coating was not washed off or scattered about by rain or wind. The coating however could be easily wiped off with dry cloth, without peeling off the paint on the repaired area which had poor under coat adhesion.

After polishing, the car surfaces were observed with naked eye, but no objectionable change such as discoloring or delustering was recognized on the painted surfaces. Rust or damages by iron powder or finely divided concrete did not occur. Thus the coating proved to be effective for protecting the applied surfaces from soil and damage.

EXAMPLE 12

A mixture was formed of 15 wt. parts of acrylic acid ester copolymer emulsion having a MFT of approximately 0° C., "Torepack #100" (product of Fujikura Kasei Co., solid component: 50), 200 wt. parts of water, 100 wt. parts of isopropanol, and 92.5 wt. parts of barium sulfate powder, by mixing the components with a stirrer for 30 minutes. The barium sulfate has a solubility in 20° C. water of $2.5 \times 10^{-4}$, and is completely non-reactive with water.

"Honda N-360" (green) was spray coated with the above composition at a ratio of approximately 50 g./m.$^2$, on dry basis. After natural drying at approximately 15° C. for an hour, the car was left outdoors for one month, uncovered. The painted car surfaces were not objectionably affected, i.e., neither discolored nor whitened. The coating was not washed off or scattered about by rain or wind, but could be easily wiped off with cloth, similarly to the case of Example 11, or washed off with water and commercial synthetic detergent. The composition thus secured effective protection against soiling with muddy water, iron powder, finely divided concrete, etc. as well as against damages.

EXAMPLE 13

To 30 wt. parts of polyvinyl acetate emulsion, Movinyl DVB, having a MFT of 15° C. (product of Hoechst Synthetic Co., solid component: 51%), 300 wt. parts of water and 85 wt. parts of finely divided nylon-6 (product of Toray Industries, Inc.) were added, followed by thorough mixing with a stirrer to form a dispersion.

The dispersion was sprayed onto a test piece on which a melamine alkyd resin paint, "Amilac" had been applied and baked at 130° C. for 30 minutes. The test piece was then forcibly dried at 80° C. to evaporate the water off, and subsequently subjected to 200 hours' Weather-O-Meter test. When the coating was removed from the test piece by washing with water after the test, the "Amilac"-painted plate showed excellent luster, without any discoloration or chalking. The test piece was also left outdoors and exposed to open air for a month, to be examined of the coating's protective action against soil and damage, with excellent results.

EXAMPLE 14

A mixture composed of carnauba wax melting at 78–84° C., paraffin wax melting at 58–60° C., Esso Naphtha No. 3, Span 60 (SP–60) and Tween 60 (ST–21) was mixed under heating at 55° C. To the mixture then water was gradually added at 60° C. under stirring, to form a wax emulsion A (cf. Table 9).

Powdered, light calcium carbonate (solubility: 0.0014/ 25° C.), ethylene-vinyl acetate copolymer emulsion, "EVAC EV–15" having a MFT of 0° C. (product of Dainippon Ink and Chemical Industries, Inc., solid component: 55%), and water were added to the above emulsion A, and mixed with a stirrer to form a dispersion B (cf. Table 10).

The dispersion was spray coated onto "Honda N-360" (white) at a ratio of, on dry basis, approximately 80 g./m.$^2$. Upon subsequent air-drying, the car surfaces were covered with white coating. The car was transported on an open wagon as it was, but the coating was not scattered about under the wind pressure, nor washed away with rain. Whereas, the coating could be easily washed off with water and brush, without concurrent peeling off of the car-coating on the repaired area having poor under coat adhesion. The car from which the coating had been washed off was polished and examined with naked eye. No recognizable deterioration in the car surfaces such as discoloration or delustering was discovered. Rusting or damages caused by iron powder of fine concrete particles neither was recognizable. Thus the composition's soil- and damage-preventing effect was clearly demonstrated.

TABLE 9

Emulsion A

| Component: | Part by weight |
|---|---|
| Carnauba wax (M.P. 78–84° C.) | 15 |
| Paraffin wax (M.P. 55–60° C.) | 15 |
| Esso Naphtha No. 3 | 10 |
| Span 50 (SP–60)[1] | 3.0 |
| Tween 60 (SP–21)[2] | 3.0 |
| Water | 54 |

[1] An ester of sorbitol condensate with stearic acid, product of Nippon Yushi Co., Ltd.
[2] An ether of Span type of (1) above with polyethylene oxide chain, product of Nippon Yushi Co.

TABLE 10

Dispersion B

| Component: | Part by weight |
|---|---|
| Emulsion A | 3 |
| Light calcium carbonate | 96 |
| EVAC EV–15 emulsion | 6 |
| Water | 200 |

EXAMPLE 15

A mixture composed of 7 parts of microcrystalline wax melting at 100° C., 0.7 part of Tween 60 (SP–21) employed in Example 14, 1.0 part of Span 60 (SP–60), 2.5 parts of zinc stearate, and 7 parts of Esso Naphtha No. 5, was heated to 90° C. Separately, a mixture of 3.0 parts of 70% sorbitol and 50 parts of water was heated to 95° C., and added to the first mixture under stirring. The system was cooled to 55° C., and formulated into a creamy dispersion by addition of 10 parts of 4% methyl cellulose. To the dispersion, 240 parts of clay, 30 parts of talc, and 10 parts of silica gel, all in powdery form, were added, together with 45 parts of "Torepack #100" (acrylic acid ester copolymer, product of Fujikura Kasei Co., solid content: 50%). The system was then diluted with water to make the non-volatile component 30% of the total system, followed by thorough mixing with a stirrer to form a homogeneous dispersion. The composition was spray-coated onto "Honda N-360" (red), at a ratio of 100 g./m.$^2$ on dry basis, and forcibly dried at 80° C. The coated car was left outdoors for a month uncovered, but the car surfaces well retained their original appearance, without showing any of such objectionable phenomena as discoloring or chalking. The coating was not washed off or scattered about by rain or wind, but could be easily wiped off with cloth. The coating thus very effectively protected the car surfaces against soiling or damages with muddy water, iron powder, fine concrete particles, etc.

EXAMPLE 16

Seventy (70) parts of polyethylene powder of 150–200μ in grain size having a MFT of approximately 0° C., 40 parts of acrylic acid ester copolymer, "Primal HA-8" (product of Nippon Acryl Co., solid content: 46%), 100 parts of water and 30 parts of the emulsion A employed in Example 14, were thoroughly mixed in a ball mill to form a dispersion. The dispersion was spray coated onto a lacquer-coated surface ("Lock Lacquer," product of Lock Paint Co.), air-dried and left outdoors for 6 months. The coating formed by the dispersion exhibited excellent weatherability, showing no impairment in appearance of the test piece after exposure. The coating could be easily washed off with commercial detergent and water, without spoiling the lacquer coating thereunder. The coating thus provided effective protection against soiling and damages with iron powder, etc.

EXAMPLES 17–18

The powder-wax type compositions of the invention form the coatings which are not easily washed away by rain or scattered about by wind during one month's exposed standing in the open air, as demonstrated in the foregoing examples. However, it is not unusual for automobiles to be stocked in the open air for more than three months. Protective action of the powder-wax type compositions against rain over such long term is not always sufficient. Also when directly exposed to torrential rain, the coating cannot always retain satisfactory performance. The attempt to meet the requirement to form the coating easily removable by water-washing brought about such shortcomings.

Such defects, however, are eliminated in the powder-wax-synthetic resin emulsion type compositions of the invention. The effects of the powder wax system and the powder-wax-synthetic resin emulsion system are compared in Table 11 below.

TABLE 12

| Component: | Part by weight |
|---|---|
| Microcrystalline wax (M.P. 85° C.) | 10 |
| Paraffin wax (M.P. 58–60° C.) | 4 |
| Rutile-type titanium oxide | 81 |
| Silica gel | 4 |
| Toshiba Silicone YF-37 | 1 |
| Esso Naphtha No. 3 | 100 |

The above composition was spray coated onto the body of "Honda N-360" (white), to a dry film thickness of approximately 100μ. The solvent was evaporated from the coating by natural drying. Substantially dry state was obtained after approximately 5 minutes, whereupon the car surfaces were covered with white coating. Thus coated car was further covered with film of 0.05 mm. in thickness of high pressure process polyethylene, "Sumikathene" (product of Sumitomo Chemicals Co.). The polyethylene film was covered on the car as intimately as possible, so that it would not be blown away by wind.

The car was then left outdoors for a month uncovered, during which the painted surfaces, metallic surfaces, rubber and plastic portions of the car were all kept in undamaged state by the coatings. The top film on the car could be easily peeled off with hand, and the coating composed mainly of titanium oxide and wax could be easily wiped off with cloth. During the wiping off, the paint thereunder at the repaired area having a poor under coat adhesion did not come off.

The car surfaces were then polished and examined with naked eye. No detrimental effect of the coatings on the painted car surfaces, such as discoloration or luster reduction was observed. No rusting occurred on the chromium-plated surface of bumper. Thus the protective action of the coatings was indeed great.

EXAMPLE 20

Door parts of "Honda N-360" were coated with the composition composed mainly of titanium oxide and wax, which was employed in Example 19, and further covered with shrinkage-wrapping polyvinyl chloride film of 50μ in thickness. The film was shrunk by heating at 120° C. for 10 seconds. Protective effect equally good as that obtained in Example 19 was confirmed. The coatings could be very easily removed.

TABLE 11

| Ex. No. | Powder | Wax | Synthetic resin emulsion | Removability of coating | Influence on painted car-surface | Protective action |
|---|---|---|---|---|---|---|
| 17 | Light calcium carbonate 96 wt. percent. | Carnauba wax (M.P. 78–84° C.) 2 wt. percent. Paraffin wax (M.P. 58–60° C.) 2 wt percent. | | Good | None | Protection against soiling and damages by iron powder, concrete powder, etc. was obtained during the exposure at outdoors for a month or so, but particularly the soil resistance was deteriorated when the exposure was prolonged over 3 months. |
| 18 | do | Carnauba wax (M.P. 78–84° C.) 0.5 wt. percent. Paraffin wax (M.P. 58–60° C.) 0.5 wt. percent. | EVAC EV-15 emulsion ¹ | do | do | After long period of exposure at outdoors over 3 months), excellent protection against soiling and damages was retained. |

¹ Resin content: 3 wt. percent.

As can be understood from Table 11 above, removability of coating and effect on the painted surfaces are good in both cases, but the powder-wax-synthetic resin emulsion system provides better protective action when the articles' standing in the open air is prolonged.

EXAMPLE 19

Microcrystalline wax melting at 85° C. and a paraffin wax melting at 58–60° C. were dissolved in Esso Naphtha No. 3 boiling at 83.0–125.5° C., under heating at 80° C. To the resulting solution rutile-type titanium oxide powder, silica gel and silicone oil (Toshiba Silicone YF-37) were added, followed by 6 hours' milling in a ball mill. The quantities of the above components were as follows.

EXAMPLE 21

Example 19 was repeated except that the undercoating composition formed mainly of titanium oxide and wax was replaced by a dispersion in Esso Naphtha No. 3, composed of 10 wt. parts of carnauba wax melting at 78–84° C., 5 wt. parts of a paraffin wax melting 58–60° C., 2 wt. parts of another paraffin wax melting at 42–44° C., 80 wt. parts of precipitated calcium carbonate powder, and 3 wt. parts of silica gel. Favorable results were obtained similarly to Example 19.

EXAMPLE 22

Fifteen (15) wt. parts of microcrystalline wax melting at 90° C., 10 wt. parts of bees wax melting at 62–70° C., 5 wt. parts of a paraffin wax melting at 42–44° C., 20 wt. parts of Esso Naphtha No. 3, Span 60 (SP–60) and Tween 60 (ST–21) were mixed under heating at 55° C. To the mixture 60° C. water was gradually added under stirring to form an emulsion. To 12 wt. parts of this emulsion, 96 wt. parts of barium sulfate powder was added followed by dilution with water to make the nonvolatile component 50%. The system was then milled in a ball mill for 17 hours to be formed into an undercoating dispersion.

The dispersion was spray coated onto the automobile bodies immediately after painting and baking, preceding the assembling operation, to a dry film thickness of 100–150μ. The bodies were then dried at atmospheric temperature of 50° C. for 20 minutes.

The bodies were then further spray coated with the solution formed by dissolving "Evaflex 150" (ethylene-vinyl acetate copolymer at 67/33 wt. percent, product of Mitsui Polychemicals Co.) in mixed solvent of Esso Naphtha No. 3-Esso Naphtha No. 5 (aliphatic hydrocarbons, products of Esso Standard Petroleum Co.) at 1:1 vol. percent, followed by 20 minutes' drying at 50° C. Thus formed top film had a thickness of 100μ.

The bodies thus covered with two layers of coatings were fabricated with other parts and assembled with accessories into automobiles, which were subsequently left outdoors for a month uncovered. The "Evaflex 150" film could be readily peeled off, and the undercoating adhering on the car surfaces could be easily washed off with water.

After polishing, the painted car surfaces had the luster substantially unchanged from that immediately after painting, and had no scratches or other damages.

EXAMPLE 23

Microcrystalline wax melting at 100–105° C., a paraffin wax melting at 68–70° C., and another paraffin wax melting at 42–44° C. were dissolved in Esso Naphtha No. 3 and ethanol. Into the solution, heavy calcium carbonate, silica gel, "Toshiba Silicone YF–37" and 2(2'-hydroxy-5'-methyl phenyl) benzotriazole were added, followed by 17 hours' milling in a ball mill, to be formed into the undercoating dispersion (A). The quantities of components employed were as follows:

TABLE 13

| Components: | Parts by weight |
| --- | --- |
| Heavy calcium carbonate | 88 |
| Microcrystalline wax (M.P. 100–105° C.) | 6 |
| Paraffin wax (M.P. 68–70° C.) | 4 |
| Paraffin wax (M.P. 42–44° C.) | 2 |
| Silica gel | 2 |
| Toshiba Silicone YF–37 | 1 |
| 2(2'-hydroxy-5'-methyl phenyl) benzotriazole | 0.05 |
| Esso Naphtha No. 5 | 80 |
| Ethanol | 20 |

Separately, 30 wt. parts of ethylene-vinyl acetate copolymer (67/33 wt. percent) were dissolved in 100 parts of commercial octane, followed by addition of 0.1 wt. part of benzoyl peroxide. Upon heating the system for an hour in nitrogen atmosphere under stirring, active radicals were introduced into the ethylene-vinyl acetate copolymer. Thereafter the system was cooled to 80° C., and to which a mixture of 36 wt. parts of methyl acrylate, 11 wt. parts of methyl methacrylate, 3 wt. parts of ethyl acrylate and 0.4 wt. part of benzoyl peroxide, followed by approximately 6 hours' stirring, to provide a very stable, emulsified dispersion (B).

Car bodies immediately after painting step but before assembling step were first spray coated with the dispersion (A) to a dry film thickness of 100–150μ, followed by 10 minutes' drying in 50° C. atmosphere.

Onto thus coated bodies, further the dispersion (B) was airless spray coated and dried at 50° C. for 20 minutes, forming top coating of 100μ in thickness.

The car bodies thus protected by two layers of coatings were put on the assembling line, attached with due accessories and fabricated into complete automobiles. The cars were left outdoors for a month uncovered, but the protective film did not come off, or was deteriorated.

The top protective film could be easily peeled off with hand, with a part of the undercoating coming off. The remaining undercoating was removable by water-washing.

The painted car surfaces showed no discoloration or chalking. Thus the coatings' protective action against soiling was indeed great. Scratches which are apt to be incurred on the surfaces during assembling were substantially perfectly prevented. Also the damages with iron powder, concrete powder, etc. were well prevented.

EXAMPLE 24 AND CONTROLS 12–14

Example 23 was repeated except that the blend ratio of heavy calcium carbonate and wax in the undercoating composition was varied in each run, while the blend ratio of microcrystalline wax and two paraffin waxes was unchanged. The results were as given in Table 14 below.

TABLE 14

| Run No. | Powder:wax | Removability of undercoating composition | Protective action |
| --- | --- | --- | --- |
| Control 12 | 20:80 | Poor | Protection against soil and damage was insufficient. |
| Control 13 | 40:60 | do | Do. |
| Example 24 | 60:40 | Normal | Satisfactory protection against soil and damage was obtained. |
| Example 23 | 88:12 | Good | Do. |
| Control 14 | 99.5:0.5 | do | The protective film was peeled off with wind and the undercoating was washed away with rain, failing to show any protective action. |

As demonstrated in the above, when the powder content of undercoating composition was below 50 wt. percent, the coating's removability became poor, i.e., it could not be easily wiped off with cloth or washed off with water.

Whereas, when the powder content exceeds 99.9 wt. percent, the top plastic film was readily peeled off with wind and the undercoating was washed away with rain, providing no effective protection of car surfaces.

CONTROLS 15–18

Example 23 was repeated except the following changes in each run, with the results as given in Table 15.

Control 15: Neither of the protective coating compositions (A) and (B) was used.
Control 16: (A) only was used but (B) was omitted.
Control 17: (A) was omitted and (B) alone was used.
Control 18: On the coating (A), water-soluble film of aqueous polyvinyl alcohol solution was formed instead of (B).

TABLE 15

Control No.: Protective action
- 15 .... The car surfaces were scratched during assembling step, and damaged with iron powder, fine concrete particles, etc. Also rusting was observed.
- 16 .... Scratches occurring during assembling step could not be prevented.
- 17 .... During peeling off of the protective film, the paint on the repaired area of the car having poor under coat adhesion partially came off with the film.
- 18 .... Because the protective film was dissolved by rain and washed away, no protective effect of the coating was obtained.

As clearly demonstrated by the foregoing experiments, in none of Controls 15 through 18 satisfactory protection of car surfaces was obtained.

EXAMPLE 25

A mixture composed of 70 parts of polyethylene powder, 5 parts of silica gel, 3 parts of "Airrol OP" (a surface active agent, product of Toho Chemicals Co.), 22 parts of microcrystalline wax melting at 90–93° C., 80 parts of Esso Naphtha No. 3, and 20 parts of ethanol, was milled in a ball mill and formed into a dispersion.

Example 23 was repeated except that the dispersion (A) therein was replaced by the above dispersion. Favorable results as in Example 23 were obtained.

EXAMPLE 26

Microcrystalline wax melting at 85° C. and a paraffin wax melting at 58–60° C. were put in a reactor, and into which Esso Naphtha No. 3 was added, followed by heating at 80° C. to dissolve the wax. The reactor content was then cooled, and into the solution talc powder, silica gel, and "Toshiba Silicone YF-37" were added, mixed and dispersed, and the mixture was milled for 6 hours in a ball mill. The blend ratio of the foregoing components was as follows.

TABLE 16

| Component: | Part by weight |
|---|---|
| Microcrystalline wax (M.P. 85° C.) | 0.2 |
| Paraffin wax (M.P. 58–60° C.) | 0.3 |
| Talc | 99.3 |
| Silica gel | 0.2 |
| Toshiba Silicone YF-37 | 1.0 |
| Esso Naphtha No. 3 | 80 |

The white dispersion obtained by the milling was diluted with Esso Naphtha No. 3 to a concentration (viscosity) suitable for spray coating. Then the dispersion was spray coated on commercial automobiles to a dry film thickness of approximately 100μ, followed by 5 minutes' forced drying at 50° C. to evaporate the solvent off.

Separately, 30 parts of an ethylene-vinyl acetate copolymer (67/33 wt. percent) was dissolved in 100 parts of commercial octane, and put in a suitable reactor. Further 0.1 part of benzoyl peroxide was added thereto, followed by an hour's stirring at reflux temperature in nitrogen atmosphere, to introduce active radicals into the ethylene-vinyl acetate copolymer. Thereafter the temperature was lowered to 80° C., and into the system a mixture composed of 36 parts of methyl methacrylate, 11 parts of methyl acrylate, 3 parts of ethyl acrylate, and 0.4 part of benzoyl peroxide was added. After subsequent 6 hours' reaction, an emulsified organosol dispersion of high stability was obtained.

This organosol dispersion was airless spraying coated on the aforesaid car surfaces coated with the white dispersion, followed by 20 minutes' forced drying at 50° C. to form film coating of 100–150μ in thickness.

Thus coated cars were left outdoors for one month in summer uncovered, and thereafter the coatings were removed. The top plastic film could be easily peeled off with hand, and the powdery undercoating could be mechanically washed off with a car-washer ("Car-Beautician," manufactured by Takeuchi Teko So.). The car surfaces retained the original appearance, without showing any discoloration or luster reduction of paint.

For comparison, the same cars were left outdoors similarly for a month, without the coatings formed thereon. Iron powder, fine concrete particles, etc. stuck into the painted surfaces which were somewhat discolored due to dust. When the powders were removed with cloth, fine scratches were formed on the car surfaces.

EXAMPLE 27

Example 26 was repeated except that the talc was replaced by polishing powder, with similarly excellent soil- and damage-preventing effect exhibited by the coatings.

EXAMPLE 28

Ten (10) parts of microcrystalline wax melting at 90° C,. 10 parts of Esso Naphtha No. 3, 5 parts of Span 60 (SP-60), and 5 parts of Tween 60 (ST-21) were mixed under heating at 55° C. To the mixture then 70 parts of water was gradually added at 60° C. under stirring, to form an emulsion. To 80 parts of this emulsion, 900 parts of titanium oxide and 92 parts of clay were added, followed by dilution with water to make the non-volatile component 50%. The diluted system was milled for 17 hours in a ball mill, to be formed into an undercoating composition.

The composition was spray coated onto commercial automobiles to a dry film thickness of approximately 100μ, and air-dried to be evaporated of the solvent. Approximately 5 minutes thereafter, substantially dry state was brought about, and the car surfaces were covered with white coating.

The car surfaces were further covered with 0.05-mm. thick film of high pressure process polyethylene, "Sumikathene," which was applied as intimately as possible with the undercoating. The cars were then left outdoors for a month (June-July) uncovered, and from which the polyethylene film was peeled off with hand, and the undercoating was washed off with a car-washer.

The painted surfaces of the cars substantially retained the original luster and remained undamaged. Thus the coatings demonstrated excellent soil- and damage-preventing effect.

Whereas, when the same cars were left outdoors for a month wtihout any protective coating, the painted surfaces of the cars showed some discoloration caused by soot, smoke and iron powder coming from nearby factories. When the surfaces were rubbed with cloth, scratches were formed due to the iron powder stuck therein.

EXAMPLE 29

Door parts of commercial automobiles were coated with an undercoating composition employed in Example 28 in which the titanium oxide was replaced by silica, and further covered with shrinkage-wrapping polyvinyl chloride film of 50μ in thickness, followed by 10 seconds' heating at 120° C. to cause shrinkage of the film. Favorable results similar to those of Example 28 were obtained. The undercoating could be completely washed off with a car-washer.

CONTROL 19-24

Example 26 was repeated except that the talc was replaced by calcium carbonate, magnesium carbonate and barium sulfate in each run. The undercoating compositions so formed were daubed onto car surfaces, which were further covered with the protective film similarly to Example 26, and left in the atmosphere of 40° C. and 90–100% RH for 2 days, with the results as shown in Table 17. For comparison, the results of same test given to uncoated cars are also given.

TABLE 17

| Run No. | Powder | Powder content (wt. part) | Removability of undercoating [1] | Influence on undercoating | Protective effect |
|---|---|---|---|---|---|
| Control 19 | Talc | 80 | Poor | Substantially no detrimental effect | Protection against soiling and damages were obtained. |
| Example 26 | do | 99.3 | Good | do | Do. |
| Control 20 | do | 100 | do | do | The film was peeled off with wind and powder, washed away with rain, giving no protective effect. |
| Control 21 | Calcium carbonate. | 99.3 | do | Paint on touch-up areas was somewhat delustered, and aluminum die cast parts, discolored. | Protective action insufficient. |
| Control 22 | Magnesium carbonate. | 99.3 | do | do | Do. |
| Control 23 | Barium sulfate. | 99.3 | do | do | Do. |
| Control 24 | | | | No protective coating was given. Aluminium die cast parts were discolored. | |

[1] The removability with a car-washer, "Car-Beautician".

When talc was used as the powder, the composition showed substantially no detrimental effect on the car surfaces, but exhibited soil- and damage-preventing action. However, when the talc content exceeded 99.0%, the coating formed therefrom could not be completely removed with the car-washer. When the powder alone but no wax was used, the top-coating film was readily peeled off by wind, and the powder was washed away with rain, failing to achieve any protective action. On the other hand, when calcium carbonate, magnesium carbonate, or barium sulfate was used as the powder, the touch-up paint under the coating showed somewhat reduced luster, and aluminium die cast parts remarkably discolored. Also when those powders were used, the top-coating film was more easily peeled off, compared with the case using talc, and therefore, the protective action of the coatings became insufficient.

When no protective coating was given to the car surfaces, aluminium die cast parts of the cars were discolored.

EXAMPLE 30

To 15 wt. parts of an acrylic acid ester copolymer having a MFT of approximately 0° C., "Torepack #100" (product of Fujikura Kasei Co., solid content: 50%), 200 wt. parts of water, 100 wt. parts of isopropanol, and 92.5 wt. parts of barium sulfate powder were added, followed by 30 minutes' mixing with a stirrer. Barium sulfate has a solubility in 20° C. water of $2.5 \times 10^{-4}$, and is non-reactive with water. Thus obtained white dispersion was diluted with water to the viscosity suitable for spray coating, and spray coated to commercial automobiles to a dry film thickness of approximately 100μ, followed by 5 minutes' forced drying at 50° C. to evaporate the solvent off.

The cars were further covered with polypropylene film of 0.5 mm. in thickness, "Torayfine BO" (biaxially stretched polypropylene, product of Toray Industries, Inc.), and left outdoors for two months of summer. Then the above-described coatings were removed. The top propylene film could be easily peeled off with hand, and the powdery undercoating was mechanically washed off with water, using a car-washer, "Car-Beautician." During the washing, the paint on repaired areas of cars having poor under coat adhesion did not come off.

After the removal, the cars were rubbed with dry cloth and any remaining water was wiped off, polished, and examined with naked eye. The car surfaces retained their original appearance, the painted portions showing no discoloration or luster reduction. No rusting or damage with iron powder and fine concrete particles was found. Thus the excellent soil- and damage-preventing effect of the subject process was evident.

Whereas, when the cars were left outdoors without any of the protective coatings, after only one month's exposure, the painted surfaces were stuck with iron powder and fine concrete particles, and discolored by rust. When the powders were wiped off with cloth, fine scratches were formed on the surfaces.

EXAMPLE 31

To 30 wt. parts of polyvinyl acetate emulsion having a MFT of 15° C., "Movinyl DVB" (product of Hoechst Synthetic Co., solid content: 51%), 300 wt. parts of water and 85 wt. parts of nylon-12 powder of 150–200μ in grain size were added, and the system was thoroughly mixed with a stirrer to form a dispersion. The dispersion was spray coated onto commercial automobiles to a dry film thickness of approximately 100μ, and the solvent was evaporated therefrom by natural drying. After about 5 minutes' drying, the coating had dry touch, and the car surfaces were covered with white coating. The car surfaces were further protected by nylon-6 (product of Toray Industries, Inc.) film, which was applied as intimately as possible to the undercoating.

The cars were thus left outdoors for three months in summer. Then the nylon film was peeled off with hand, and the undercoating was washed off with a car-washer.

The painted car surfaces had the luster substantially equal with that immediately after painting, and remained undamaged, proving the excellent soil- and damage-preventing effect of the coatings.

Whereas, the same cars exposed in the open air without the protective coatings showed some discoloration of painted surfaces due to soot, smoke and iron powder coming from nearby factories, after only one month's standing. When the surfaces were rubbed with cloth, fine scratches were formed with the iron powder stuck in the paint.

EXAMPLE 32

Example 30 was repeated except that the top coating was replaced by the acrylic organosol dispersion described in Example 26, which was airless spraying coated and dried at 50° C. for 20 minutes, forming coating film of 100–150μ in thickness. Thus coated cars were left in the open air for two months. The coatings exhibited excellent soil- and damage-preventing effect similarly to Example 30.

EXAMPLE 33

Example 30 was repeated, except that the barium sulfate powder was replaced by polishing powder. The coatings exhibited good soil- and damage-preventing effect similarly to Example 30.

EXAMPLE 34

A mixture composed of carnauba wax melting at 78–84° C., a paraffin wax melting at 58–60° C., Esso Naphtha No. 3, Span 60 (SP-60), and Tween 60 (ST-21) was mixed under heating. To the mixture then 60° C. water was gradually added under stirring to form a wax emulsion A (cf. Table 18).

To the emulsion A, light calcium carbonate powder (solubility: 0.0014/25° C.), an acrylic emulsion having a MFT of 0° C., "Torepack #100" and water were added, mixed with stirrer, to form dispersion B (cf. Table 19).

The dispersion was spray coated onto commercial cars at the ratio of, on dry basis, approximately 80 g./m.$^2$, and forcibly dried at 50° C. for 10 minutes. Whereupon the car surfaces were covered with white coating. Thus coated car surfaces were further covered with 0.05-mm. thick polypropylene film, "Torayfine–BO."

The cars were left in the open air for two months in summer, and thereafter removed of the coverings. The top polypropylene film could be easily peeled off with hand, and the powdery undercoating could be mechanically washed off with water and car-washer (Car-Beautician). After polishing, the car surfaces were examined with naked eye, with no detrimental effect of the coatings on the painted surfaces, such as discoloring or luster reduction, recognizable. Rust or damage due to iron powder, fine concrete particles, etc. neither was found. Thus the coatings proved to have soil- and damage-preventing effect.

In contrast thereto, when the same cars were left in the open air without the protective coatings, only after one month of standing their painted surfaces were slightly discolored by soot, smoke and iron powder coming from nearby factories. When the surfaces were rubbed with cloth, scratches were formed due to the iron powder stuck therein.

TABLE 18

Emulsion A

| Component: | Part by weight |
|---|---|
| Carnauba wax (M.P. 78–84° C.) | 15 |
| Paraffin wax (M.P. 58–60° C.) | 15 |
| Esso Naphtha No. 3 | 10 |
| Span 60 (SP-60) | 3.0 |
| Tween 60 (ST-21) | 3.0 |
| Water | 54 |

TABLE 19

Dispersion B

| Component: | Part by weight |
|---|---|
| Emulsion A | 3 |
| Light calcium carbonate | 96 |
| "Torepack #100" | 6 |
| Water | 100 |

EXAMPLE 35

A mixture composed of 7 parts of microcrystalline wax melting at 90° C., 0.7 part of Tween 60 (SP-21) and 1.0 part of Span 60 (SP-60) employed in Example 34, 2.5 parts of zinc stearate, and 7 parts of Isoper E, was heated to 95–100° C. Separately, a mixture of 3.0 parts of 70% sorbitol and 50 parts of water was heated to 95° C., and added to the first mixture under stirring. The system was subsequently cooled to 55° C., and formed into a creamy dispersion by addition of 10 parts of 4% methyl cellulose. To said dispersion, further 30 parts of rutile-type titanium oxide, 200 parts of clay, 50 parts of silica gel, all in powdery form were added, stirred in a dissolver, and to which further 45 parts of an ethylene-vinyl acetate copolymer emulsion, "EVAC EV-15" was added. The whole system was diluted with water to make the content of non-volatile component 30%, followed by 8 hours' milling in a ball mill. Thus an opaque undercoating dispersion was prepared.

The dispersion was spray coated onto commercial cars to a dry film thickness of approximately 100μ, and forcibly dried at 50° C., for 10 minutes. Thus coated cars were further spray coated with a solution formed by dissolving "Evaflex #150" 50:50 (by volume) mixed solvent of Esso Naphtha No. 3 and Esso Naphtha No. 5, again followed by drying at 50° C. for 20 minutes. Thus formed top coating film had a thickness of approximately 100μ.

The cars were allowed to stand in the open air in that state for three months. The "Evaflex #150" film was not peeled off, but retained the state of its intimate coverage of the undercoating. The top film however could be easily peeled off with hand, and the undercoating could be easily wiped off with cloth. After polishing, the painted car surfaces showed unchanged luster. No discoloration of the paint was observed.

Whereas, the cars similarly left outdoors without the protective coatings showed discoloring of painted surfaces due to rust, and had iron powder and fine concrete particles stuck therein, only after one month of the exposure. When the iron powder, etc. was wiped off with cloth, it left fine scratches on the painted car surfaces.

EXAMPLE 36

Example 34 was repeated except that the polypropylene film used as the top coating was replaced by the acrylic organosol dispersion described in Example 26. The dispersion was airless spraying coated onto the under coating, and dried at 50° C. for 20 minutes, forming the film of 100–150μ in thickness. The cars were left in the open air for two months but remained undamaged. Thus the coatings' soil- and damage-preventing effect similar to that of Example 34 was demonstrated.

EXAMPLE 37

Seventy (70) parts of polyethylene powder of 150–200μ, 40 parts of acrylic acid ester copolymer having a MFT of 30° C., "Primal HA-8" (product of Nippon Acryl Co., solid content: 46%), 100 parts of water, and 30 parts of emulsion A employed in Example 34, were thoroughly mixed in a ball mill to form a dispersion. Thus obtained composition was spray coated onto commercial automobiles to a dry film thickness of approximately 100μ, and dried at 50° C. for 20 minutes. Whereupon the car surfaces were covered with white coating.

On said undercoating, further nylon-6 film (product of Toray Industries, Inc.) was applied. Thus coated cars were left in the open air for a month, and thereafter the top film was peeled off with hand, and the underocating was washed off with a car-washer. The car surfaces retained the original luster and was substantially undamaged, persuasively demonstrating the coatings' excellent soil- and damage-preventing effect.

What is claimed is:

1. A method for temporarily protecting the surfaces of an article, which comprises coating the surfaces with a composition consisting essentially of a mixture of 50–99.9% by weight of at least one powder selected from the group consisting of inorganic powders selected from talc, clay, titanium oxide, barium sulfate, calcium carbonate and silica gel and powders of thermoplastic and thermosetting resins having no reactivity with water, and a solubility in 100 g. of 20° C. water of not greater than 1 gram, the grain size of said powders being from 0.01 to 200 microns, and 0.1–50% by wieght of at least one dispersant-binder selected from the group consisting of wax emulsions and synthetic resin emulsions with water serving as the main solvent, wherein said synthetic resin is selected from polyvinyl chloride, vinyl chloride-vinyl acetate copolymer, ethylene-vinyl acetate copolymer, polyvinyl acetate, polyacrylates, acrylate copolymers, acrylonitrile-acrylate copolymers, vinylidene chloride-vinyl chloride copolymers, polystyrene, styrene-butadiene copolymers, and methyl acrylate-butadiene copolymers, allowing said composition to dry, and thereafter forming on the so-coated surfaces an easily removable water-insoluble plastic coating selected from the group consisting of polyethylene, polypropylene, polyvinyl chloride, polyester, polyamide and ethylene-vinyl acetate copolymer.

2. A method for temporarily protecting articles' surfaces, which comprises coating the surfaces with a composition consisting essentially of a mixture of 50–99.9% by weight of at least one powder selected from the group consisting of inorganic powders selected from talc, clay, titanium oxide, barium sulfate, calcium carbonate and silica gel and powders of thermoplastic and thermosetting resins having no reactivity with water, and a solubility in 100 g. of 20° C. water of not greater than 1 gram, said thermoplastic or thermosetting resin being selected from polyethylene, polypropylene, polyvinyl chloride, polystyrene, polyamides, polyesters, acrylic resins, phenolic resins, urea resins and melamine resins, the grain size of said powders being from 0.01 to 200 microns, and 0.1–50% by weight of a dispersant-binder consisting of wax with water serving as the main solvent, allowing said composition to dry, and further forming on the coated surfaces an easily removable water-insoluble plastic coating selected from the group consisting of polyethylene, polypropylene, polyvinyl chloride, polyester, polyamide and ethylene-vinyl acetate copolymer.

3. A method for temporarily protecting the surfaces of an article, which comprises coating the surfaces with a composition consisting essentially of a mixture of 50–99.9% by weight of at least one powder selected from the group consisting of inorganic powders selected from talc, clay, titanium oxide, barium sulfate, calcium carbonate and silica gel and powders of thermoplastic and thermosetting resins having no reactivity with water, and a solubility in 100 g. of 20° C. water of not greater than 1 gram, said thermoplastic or thermosetting resin being selected from polyethylene, polypropylene, polyvinyl chloride, polystyrene, polyamides, polyesters, acrylic resins, phenolic resins, urea resins and melamine resins, the grain size of said powders being from 0.01 to 200 microns, and 0.1–50% by weight of a dispersant-binder consisting of wax and synthetic resin emulsion with water serving as the main solvent, wherein said synthetic resin is selected from polyvinyl chloride, vinyl chloride-vinyl acetate copolymer, ethylene-vinyl acetate copolymer, polyvinyl acetate, polyacrylates, acrylate copolymers, acrylonitrile-acrylate copolymers, vinylidene chloride-vinyl chloride copolymers, polystyrene, styrene-butadiene copolymers, and methyl acrylate-butadiene copolymers, allowing said composition to dry, and further forming on the coated surfaces an easily removable water-insoluble plastic coating selected from the group consisting of polyethylene, polypropylene, polyvinyl chloride, polyester, polyamide and ethylene-vinyl acetate copolymer.

4. A method for temporarily protecting the surfaces of an article, which comprises coating the surfaces with a composition consisting essentially of a mixture of 50–99.9% by weight of at least one powder selected from the group consisting of inorganic powders selected from talc, clay, titanium oxide, barium sulfate, calcium carbonate and silica gel and powders of thermoplastic and thermosetting resins having no reactivity with water, and a solubility in 100 g. of 20° C. water of not greater than 1 gram, said thermoplastic or thermosetting resin being selected from polyethylene, polypropylene, polyvinyl chloride, polystyrene, polyamides, polyesters, acrylic resins, phenolic resins, urea resins and melamine resins, the grain size of said powders being from 0.01 to 200 microns, and 0.1–50% by weight of a dispersant-binder consisting of synthetic resin emulsion with water serving as the main solvent, wherein said synthetic resin is selected from polyvinyl chloride, vinyl chloride-vinyl acetate copolymer, ethylene-vinyl acetate copolymer, polyvinyl acetate, polyacrylates, acrylate copolymers, acrylonitrile-acrylate copolymers, vinylidene chloride-vinyl chloride copolymers, polystyrene, styrene-butadiene copolymers, and methyl acrylate-butadiene copolymers, forming on said surfaces the film of said composition at temperatures ranging from $-60$ to $100°$ C., and allowing said film to dry, and further forming on said film coating an easily removable water-insoluble plastic coating selected from the group consisting of polyethylene, polypropylene, polyvinyl chloride, polyester, polyamide and ethylene-vinyl acetate copolymer.

References Cited
UNITED STATES PATENTS

| | | | |
|---|---|---|---|
| 2,020,256 | 11/1935 | Copeman | 117—6 |
| 3,231,410 | 1/1966 | Huber et al. | 117—75 |
| 2,020,255 | 11/1935 | Copeman | 117—6 X |
| 3,454,433 | 7/1969 | Mueller | 117—6 X |
| 3,463,871 | 8/1969 | Rogers | 117—6 X |
| 3,544,349 | 12/1970 | Isaksen et al. | 117—75 X |
| 3,577,508 | 5/1971 | Desaulniers | 117—75 X |
| 3,583,932 | 6/1971 | Benton et al. | 117—6 X |

RALPH HUSACK, Primary Examiner

U.S. Cl. X.R.

117—26, 72, 75, 92; 161—406; 260—28.5 R